Jan. 26, 1943.   L. C. WATERMAN   2,309,228
FLUID INDICATING AND CONTROL MEANS
Filed March 19, 1940
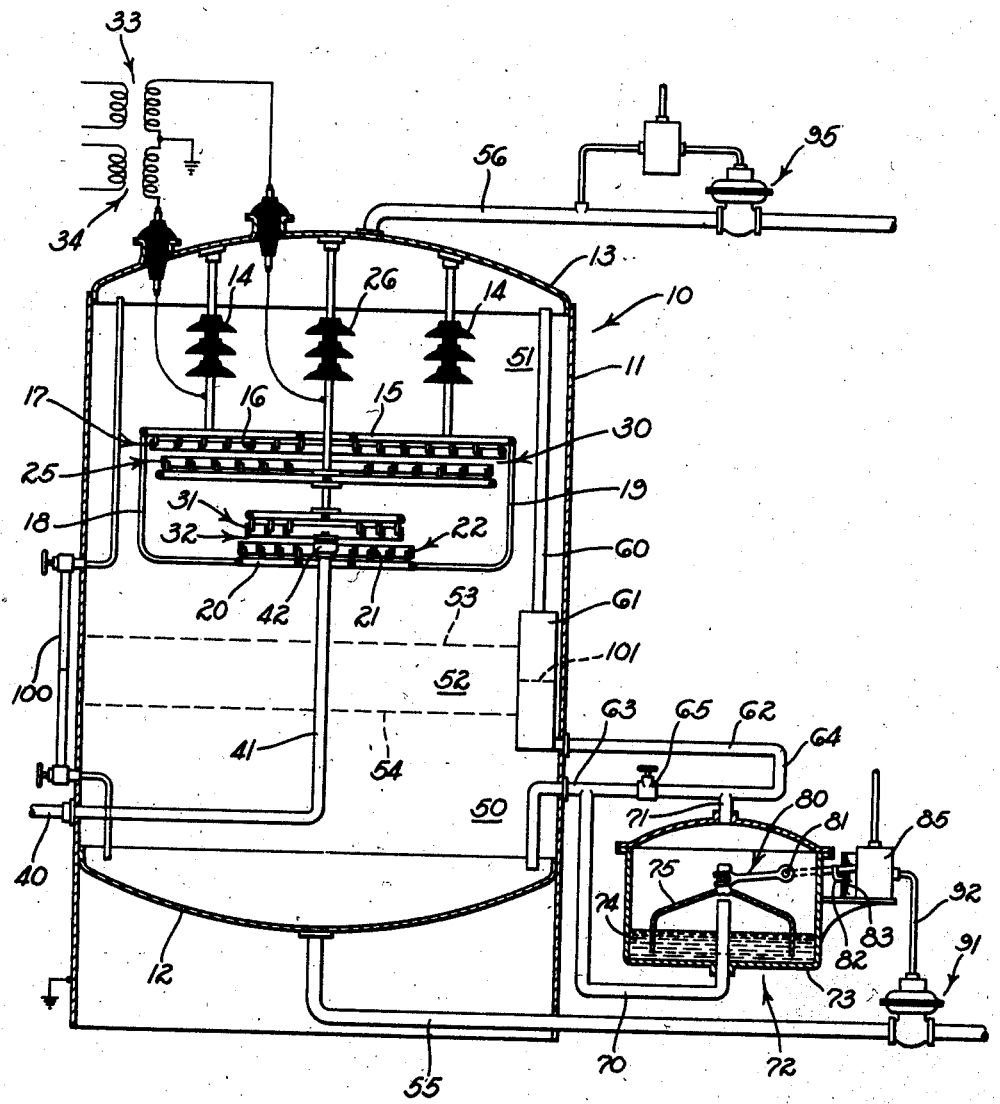
INVENTOR
LOGAN C. WATERMAN
BY HARRIS, KIECH, FOSTER & HARRIS
ATTORNEYS.

Patented Jan. 26, 1943

2,309,228

UNITED STATES PATENT OFFICE 2,309,228

FLUID INDICATING AND CONTROL MEANS

Logan C. Waterman, Houston, Tex., assignor to Petrolite Corporation, Ltd., Wilmington, Del., a corporation of Delaware Application March 19 1940, Serial No. 324,841

13 Claims. (Cl. 137—68)

This invention relates to apparatus for indicating and/or controlling the quantity of a fluid in a vessel partially filled with another fluid, and relates more particularly to means for controlling fluid flow to or from such a vessel in such manner as to maintain the relative proportions of fluids therein substantially constant.

It is frequently desirable to control flow rates in such manner as to maintain constant the quantity of a fluid in a space partially filled with another fluid gravitationally separable from the first fluid. In instances where the two fluids separate with sufficient distinctness to form a fluid interface, the problem may be regarded as one of maintaining a constant interfacial level.

In the electric resolution of oil-continuous emulsions, this general problem is of great importance since normally the treating gradient is established in an environment of oil, and if water is not withdrawn as rapidly as it separates, it may accumulate to the degree that it short-circuits the electrodes. On the other hand, if the separated water is withdrawn too rapidly, oil may be wasted therewith. This specific problem is frequently complicated by the accumulation of layers of intermediate density between the water and oil, these layers being constituted by a coarse emulsion or a sludge which serves to obscure or diffuse the interfacial zone. Even in the absence of sludge, there is normally a variation in density in the oil-continuous phase arising from the gravitational settling and concentration of the dispersed masses of water, such that there may be insufficient discontinuity in density across the interface to permit the efficient use in the treater of a mechanical interfacial float or other conventional control means.

It is a general object of the present invention to provide means responsive to the quantity of a fluid in a space partially filled with another fluid, and to indicate and/or control said quantity by said means.

It is an object of the present invention to provide means for maintaining a substantially constant quantity of water in a vessel into which a mixture of oil and water is continuously introduced and from which oil and water are continuously withdrawn.

It is a further object of the present invention to provide means for maintaining constant the amount of water in a treater electrically resolving a stream of water-in-oil emulsions.

It is an object of the present invention to provide control means of the kind described which is responsive to variations in pressure at a locus in the lower portion of the vessel relative to a reference pressure, preferably a pressure at a locus in the upper portion of the vessel, and to provide an energizing pressure differential for said control means which may be readily adjusted to zero or equilibrium value for any desired amount of water, whereby the control is effective relative to variations from said desired amount.

It is a further object to provide a control means which may be optionally located relative to said vessel and to any fluid interface therein, and which without relocation is adapted to maintain any desired interfacial level.

Further objects and aspects of the present invention will become apparent from the following discussion of the drawing, in which:

The drawing is a vertical cross section of an electric treater provided with a control device embodying the present invention.

Referring to the drawing, 10 is an electric treater comprising a cylindrical shell 11 closed at the bottom by a plate 12 and at the top by a plate 13. Suspended from the top plate by means of insulators 14 is a cross bar 15 from which depends a series of coaxial rings 16 concentric with the shell 11. These rings constitute an electrode structure 17. Suspended from the cross bar 15 by means of rods 18 and 19 is another cross bar 20 on which are mounted a series of concentric rings 21 to form an electrode structure 22. The electrode structures 17 and 22 are electrically connected by means of the intervening rods and cross bars.

Suspended from the top plate 13 by means of an insulator 26 is a concentric ring electrode structure 25 which defines in conjunction with the electrode structure 17 an intervening treating space 30. Mechanically and electrically associated with the electrode structure 25 is a fourth electrode structure 31 cooperating with the lowest electrode structure 22 to form an intervening treating space 32. As indicated, insulated leads and two high-potential transformers 33 and 34 connected additively are provided for the energization of the electrodes.

The lower treating space 32 constitutes the main treating space into which the incoming emulsion is discharged. This emulsion is supplied to the treater by means of a pipe 40 which extends into the interior of the treater to join with a vertically and centrally positioned riser 41 terminating in a spring-loaded discharge valve 42 adapted to discharge the incoming emulsion radially outward in a substantially horizontal sheet in the treating space 32.

Under the action of an alternating high gradient potential established in the treating field 32, many of the droplets of water comprised in the incoming emulsion are coalesced to masses of sufficient size to settle out of the oil. Further coalescing action is provided by the treating space 30 into which some residual emulsion may find its way by conveyance by the rising currents of oil or, more particularly, by recycling currents set up by the aspirating action of the discharge nozzle 42. Such recycle currents serve to recycle a considerable portion of the partially-treated emulsion back through the main treating field 32 from regions both above and below this field. As just indicated, the recycle currents set up above the field 32 are subjected to treatment by the field 30, and the recycle currents below the field 32 are subjected to further treatment by an auxiliary field set up between the lower electrode 22 and a body of water 50 accumulating in the lower part of the treater from settled masses of water.

The dry oil which will normally contain some small residual quantity of water, for example about 1%, accumulates as an oil body 51 in the upper part of the treater. Between these layers, as below the treating space 30 and, in particular, below the treating space 32, there is a mixture of oil and dispersed relatively large masses of coalesced water which are undergoing a process of gravitational separation, the oil tending to rise upwardly and the water masses to settle downwardly. As the water droplets settle, they pass through a region of quite high water concentration before they reach the water-continuous phase represented by the body of water 50. Such an interfacial region is indicated in the drawing by the numeral 52 as existing between an upper dotted line 53 and a lower dotted line 54, it being understood that there is not necessarily any abrupt discontinuity such as might be indicated by the arbitrary positioning of these lines. In most instances, the zone 52 will contain mingled oil and water present as poly-phase emulsions, sludge, and the like, as described in greater detail hereinafter. The lower part of this zone 52 may be regarded as a zone of transition from an oil-continuous phase to a water-continuous phase.

Water is withdrawn from the lower body of water 50 by a pipe 55 connected into the lower plate 12, and oil is withdrawn from the upper body of oil 51 by means of a pipe 56 connecting into the upper plate 13. In accordance with this invention, the water and oil are withdrawn at substantially their respective introduction rates, whereby the interfacial region or separation zone 52 may be maintained at the desired level below the electrodes or, more specifically, whereby the quantity of water in the treater 10 may be maintained substantially constant.

The control means for indicating or controlling the quantity of water in the treater comprises essentially an interrupted conduit or passageway enclosing a hydrostatic control column and extending from a level in the oil body to a level in the water body, that is, a passageway extending above and below the zone of separation 52 and having an interruption or closure therein across which a device responsive to differential pressures may be placed. In the embodiment shown, this passageway comprises a vertical pipe 60 with an enlarged portion 61, these sections being positioned within the tank, a horizontal pipe 62 extending from the enlarged section 61 to the exterior of the treater, a pipe 63 extending from a point in the water body 50 to the exterior of the treater, and a connection 64 between the pipes 62 and 63. The upper end of the pipe 60 and the lower end of the pipe 63 are open to permit open communication with the adjacent liquids, and an interruption or closure is provided by any suitable means in a portion of the passage. A valve 65 mounted on the pipe 63 is shown in this capacity.

Any pressure differential across this valve 65 is transmitted by means of pipes 70 and 71 to a differential pressure device 72, suitably a bell-type manometer as shown in the drawing. The manometer as shown comprises a closed housing 73 partially filled with a pool of mercury 74. A bell 75 floats in this mercury and is subject to vertical displacements which vary with the pressure differential between the inside and outside of the bell. The space inside the bell and above the mercury is filled with water in which the open-ended pipe 70 terminates. The space outside the bell is filled with water having direct access to the pipe 71. Accordingly, the position of the bell varies with the pressure differential across the valve 65, and the vertical displacement thereof in response to variations of pressure differential may be picked up by means of a pin-and-yoke linkage 80 and employed to turn a shaft 81 extending through a suitable bearing and stuffing box to the exterior of the housing 73. The shaft 81 may carry a pointer 82 registering against a scale element 83, thus indicating the effective pressure differential. For purposes of control, the pointer 82 may be continued to provide an operative connection to a compressed air pilot valve 85.

The pilot valve 85 may be employed to govern any fluid flow, the variation of which will produce corresponding variations in the interfacial level or the relative proportions of water and oil in the treater. In the embodiment shown, it is the rate of water withdrawal which has been selected for control. To effect the desired control of the effluent water, a diaphragm-operated control valve 91 is placed in the pipe 55, and an operative connection to the pilot valve 85 is provided by means of a compressed air pipe 92.

Since the total volume of fluid in the treater 10 remains constant, the control of the effluent water suffices to fix the appropriate rate of oil withdrawal through the pipe 56. The rate of oil withdrawal, however, may be varied sufficiently to maintain desired operating conditions in the treater 10, and, in particular, to maintain a uniform superatmospheric pressure on the fluids in the tank. Accordingly, I provide a pressure-responsive valve 95 on the pipe 56, whereby the desired operating pressure may be uniformly maintained.

The control device operates as follows: The desired control setting is first made by opening the valve 65 and manually or otherwise adjusting the withdrawal rate to obtain the desired interfacial level or proportion of water. If desired, a conventional sight glass 100 may be employed for visual indication during this preliminary period. The valve 65 being open, the control passageway is filled with water from the bottom and oil from the top, these two liquids meeting at an interface 101 in the enlarged portion 61 of the control passageway. The valve 65 is then closed, and as long as there is no substantial change in the quantity of water in the treater, no pressure differential is set up across this valve. If, however, the interface in the treater 10 rises or the quantity of water in the treater 10 is otherwise increased, the hydrostatic pressure on the body of water at the level corresponding to the pipe 63 is correspondingly increased, whereas the pressure transmitted by the pipe 62 to the other side of the valve 65 remains unchanged. Accordingly, a pressure differential is set up across the valve 65 which varies with the variation of the amount of water in the treater, this differential becoming zero when the quantity of water corresponds to the predetermined quantity.

The operative connections between the pressure differential device 72 and the control valve 91 are so arranged that variations in the pressure differential will produce corresponding changes in the rate of withdrawal which are corrective of the indicated change in water level, increasing the rate of water withdrawal when the quantity of water exceeds the predetermined amount, and decreasing the rate when the quantity of water in the treater falls below the predetermined amount.

In most manometric devices, including the bell-type manometer shown, there exists some displacing action arising from the movements caused by variations in the imposed pressure; for example, as the bell 75 rises, it displaces water upwardly through the pipe 71, which has the effect of raising the interface 101 and decreasing the sensitivity of the control. I have found that the desired sensitivity may be maintained, however, if the cross-sectional area of the interface 101 is made larger than would be the case if this interface was in a passage of a size corresponding to the vertical pipe 60. As shown, the interface 101 is maintained in the enlarged portion 61, and I have found that the cross-sectional area of the interface 101 should be at least a quarter of the area represented by the displacing cross section of the bell 75.

By the use of this control means, a positive and effective control of the amount of water present in the treater is provided, irrespective of whether this water has broken clear from the oil to give a distinct interfacial boundary or whether the water has collected as a concentrated coarse emulsion or sludge with no continuous phase of water. Consequently, in the case of oils which tend to sludge badly, such sludge will be withdrawn, as well as any free water present, whenever such withdrawal is necessary to maintain the quantity of water in the treater constant.

Various other advantages are resident in the present control device, among which may be mentioned the following. Since the control is dependent essentially on a differential in pressure arising from changes in average density in the treater contents intermediate the terminals of the control passageway, the control remains unaffected by changes in absolute pressure, such as, for example, the pressure which is maintained on the exit oil stream by means of the valve 95.

The positioning of at least a major portion of the control passageway within the treater is of substantial advantage when any pronounced temperature changes are experienced either inside or outside the treater since, by maintaining the control passageway within the treater, the columns of fluids therein is maintained at substantially the same temperature as the contents of the treater, and, hence, effects of temperature on density and hydrostatic gradient will be the same both for the liquids in the treater and the liquids in the hydrostatic control column.

A very important advantage of the present control device is that it may be set for any desired level or quantity of water without shifting or re-locating any of the assembled apparatus. This is made possible in view of the shunting characteristic of the valve 65, which, when opened, permits the establishment of a zero pressure differential for any desired level, and which, when closed, permits the effective control of any subsequent variations from the predetermined level or quantity of water. Since the pressure differential responsive device is normally operated at or near a zero differential, a very sensitive instrument may be used, i. e., an instrument of relatively small range. For example by using a manometric device with a range of about 2½ inches of water pressure, which device will normally display a sensitivity corresponding to about 5% of this range, I am able to maintain the interfacial level within an inch of the desired level. For example, in the case of oil with a 35° A. P. I. gravity, there is, between such an oil and water at 180° F., about 0.15 specific gravity differential, whereby a manometer having a sensitivity of .125 inch of water will control the interfacial level to within .125/.15, or .8 inch. It will, of course, be understood that it is not necessarily the variation in interfacial level but rather the variation in the average density of the treater contents as between the upper and lower terminals of the control column which is effective, whereby control may be established and maintained even in the absence of a clear-cut interface.

While the control setting is best established by closing the valve 65 at a time when the desired water content is present in the treater, it will be apparent that minor adjustments of this control setting may be made within the range of the instruments employed, including adjustments of the pressure differential device 72, the pneumatic pilot valve 85, and the control valve 91.

Not only is the control device adapted to maintain any predetermined level without re-location of any of the apparatus, but the apparatus itself, in particular the pressure differential device 72, may be located at any convenient level and position relative to the valve 65. This follows from the fact that the pipes 70 and 71 are both filled with water, whereby any hydrostatic gradient arising in one of these pipes due to the variation in level between the manometer 72 and the valve 65 is exactly counterbalanced by a similar hydrostatic gradient in the other of these pipes, the net result being that the pressure differential across the manometric device is the same as the pressure differential across the valve 65, irrespective of the vertical distance between the valve and the manometer.

I find that, in most instances, it is very advantageous to prolong the control passageway a substantial distance up into the oil layer, for example, as shown by the vertical extent of the pipe 60 in the drawing. In this manner, the oil terminus of the control passageway is at a locus well above the zone of settling water, whereby any variations in average density throughout the entire region of settling constitute an effective factor in control. It is also desirable to have the oil terminal located in the relatively dry oil present in the upper portion of the treater in order to prevent the entrance of any water into the control passageway, such as might result at a lower position from effects of breathing, settling of entrained particles, or the like, since the entrance of such water would serve to change the average density of the fluid in the control column. Conversely, it is similarly desirable that the lower or water terminal be located in the lower portion of the water body to minimize accidental entry of oil into the lower portion of the control passageway.

Various modifications in the described embodiment are possible, some of which may be mentioned specifically. Various sources of reference pressure may be used, but preferably a hydrostatic column is employed, one end of which is in open communication with one of the fluid bodies in the treater. The liquid in the hydrostatic reference column need not be constituted by superimposed layers of oil and water, as illustrated, but may be any liquid or mixture of liquids having a density intermediate that of oil and water, i. e., corresponding to the average density which it is desired to maintain between the control levels in the treater.

If desired, the control passageway may be located external to the treater, and also, if desired, the fluid contents of the control column in said passageway may be prevented from direct contact with the fluid in the treater by interposition of a third fluid suitably in a U-tube or fluid seal pot. In general, any interfaces subjected to displacement by movement of the differential pressure responsive device, such as fluid interfaces in a seal pot of the kind just described, should have a horizontal cross-sectional area not less than ¼ of the displacing area of the pressure differential responsive device.

In the embodiment shown in the drawing, the closure in the control passageway is provided by the valve 65, which is situated in the lower part of the passageway below the upper surface of the water body 50. While this, in most cases, constitutes an advantageous and preferred location for the closure, it is not necessary for the operation of the device that the closure be made at any particular level in the control passageway. Thus, a closure could be provided at a level corresponding to a level in the upper part of the oil body, for example, near the upper end of the pipe 60, and the pressure differential across this closure employed for the indication and/or control of the quantities of the respective fluids in the treater. It will be apparent that, if the closure is located in the upper portion of the pipe 60, the hydrostatic pressure of the control column below this point will subtract from the effective water pressure at the lower terminal of the passageway, while, in the embodiment shown, the hydrostatic pressure of the control column adds to the pressure prevailing at the upper terminus of the pipe 60 in the oil body. In either instance, the control column exercises a constant additive or subtractive pressure which may be used to compare with the hydrostatic gradient between the control levels in the treater itself, whereby variations in this latter gradient may be indicated and/or used for control. If the closure is made at intermediate points, the upper and lower portions of the control column may exercise additive and subtractive pressures respectively without, however, affecting the fundamental nature of the response.

Any suitable type of pressure device which is responsive to differential pressures may be developed in connection with my invention instead of the bell-type manometer illustrated in the drawing. Other liquid seal manometers may be used, such as a mercury-filled U-tube manometer with a float chamber in one leg, or mechanically sealed devices comprising flexible diaphragms or bellows may be employed, or, in general, any known device may be used which is adapted to receive two different pressures and register the differential pressure therebetween. Where such registration is accompanied by a movement which tends to displace the fluid in the control column, that portion of the control passageway which contains an interfacial boundary or other sharp discontinuity of density should be of sufficient diameter that the displacing motion of the manometric device does not produce a vertical displacement of such an interface or discontinuity greater than about four times the manometric displacement, in order to maintain the desired sensitivity of control.

Any type of connection may be employed between the pressure responsive device and the control valve which is operative to produce a corrective adjustment of the control valve. I find that the pneumatic means of control illustrated in the drawing is very convenient and advantageous to use, but various other operative connections may be employed, for example, mechanical linkages, electrical connections, and the like.

In most instances, I prefer to control the rate of water withdrawal as shown in the drawing in order to maintain the desired constancy of interfacial level or composition in the treater. It will be clear, however, that the control valve can be placed on any stream, the variation of which is productive of corresponding variations in interfacial level. For example, the control valve may be placed on the oil draw-off line and the water bleed line controlled to maintain the desired pressure. Alternatively, the water may be drawn at a constant rate, the oil withdrawal line controlled to give constant pressure, and the control responsive to the pressure differential made with respect to the rate at which emulsion is introduced into the treater.

It will be obvious that the advantageous application of my control device is not limited to its use in connection with electric dehydrators, but that it may be also used with other types of flow-line decanters, or, in general, in connection with any vessel in which the relative proportions of two gravitationally separable fluids are variable. It should be understood that the details of the above description are illustrative rather than limiting, and that various modifications of the embodiment shown may be made or used without departing from the essence of my invention as defined by the scope of the appended claims.

I claim as my invention:

1. In combination in a device for maintaining an inter-fluid level in a tank containing an upper relatively light fluid and a lower relatively dense fluid: a flow conduit providing a fluid passageway communicating with said tank; adjustable valve means in said flow conduit to control fluid passage therethrough to modify the inter-fluid level in said tank; walls defining a control passageway between a locus in the upper portion of said tank and a locus in the lower portion of said tank, said loci being respectively above and below the desired inter-fluid level; means to establish a fluid closure in said passageway whereby variations in average density of the fluids between the upper and lower loci in said tank set up corresponding pressure differentials across said closure; and means responsive to said pressure differentials to control said adjustable valve means whereby corrective variations in fluid flow through said flow conduit are set up in response to variations in the inter-fluid level.

2. A combination as in claim 1, in which the means to establish closure includes a valve, whereby the pressure differential may be brought to zero by opening said valve, and control established with respect to subsequent variations by closing said valve.

3. Control means for regulating the proportionate quantities of two liquids of differing densities stratifying with an interfacial region in a continuously operating separator, said control means governing an outflow valve for one of the two liquids, said control means including: walls defining a control passage between a locus in the upper stratum in the vessel and a locus in the lower stratum in the vessel; closure means to close said passage against passage of liquids whereby variations in average density between the upper and lower loci in said vessel set up corresponding pressure differentials across said closure; movable means movable in response to the pressure differential across said closure; and an operative connection from said movable means to said valve means whereby said valve is automatically adjusted to maintain the desired average density between said loci.

4. A combination as set forth in claim 3 in which said closure means includes a valve whereby the pressure differential may be brought to zero by opening said valve, and control may be established with respect to subsequent variations by closing said valve.

5. A combination as set forth in claim 3 in which said closure means includes a valve positioned at a level between one of said loci and the interfacial region whereby the liquid corresponding to said locus will fill the passageway in the vicinity of the valve when said valve is open, thus providing liquid of the same density on each side of said valve when the valve is closed.

6. In combination in a device for regulating the relative amounts of two fluids in a vessel under superatmospheric pressure, said fluids comprising an upper relatively light fluid and a lower relatively dense fluid: a flow conduit providing a fluid passageway communicating with said vessel; adjustable valve means in said flow conduit to control fluid passage therethrough to modify the relative amounts of the two fluids in said vessel; means responsive to differential pressure to control said adjustable valve; means providing pressure communication from said lower fluid to said differential pressure means, the pressure transmitted thereby varying with the quantity of said lower fluid in said vessel relative to said upper fluid in the vessel; a reference fluid body normally independent of variations in the relative quantity of said lower fluid in said tank; and means for applying to said reference fluid body a pressure substantially corresponding to said superatmospheric pressure in the upper end of said vessel, said reference fluid body exerting a reference pressure in said differential pressure means in opposition to said transmitted pressure from the lower fluid, said reference pressure being of a magnitude to balance the pressure transmitted from the lower fluid at a predetermined quantity of the lower fluid in the vessel relative to the upper fluid in the vessel whereby said responsive means acts automatically to maintain said predetermined quantity of the lower fluid relative to the upper fluid in the vessel.

7. In combination in a device for regulating the relative amounts of two fluids in a vessel, said fluids comprising an upper relatively light fluid and a lower relatively dense fluid: a flow conduit providing a fluid passageway communicating with said vessel; adjustable valve means in said flow conduit to control fluid passage therethrough to modify the relative amounts of the two fluids in said vessel; a displacement means movable in response to fluid pressure to control said adjustable valve; means providing pressure communication from said lower body of fluid to said displacement means, the pressure communicated thereby varying with the quantity of said lower fluid in said vessel relative to the quantity of said upper fluid; and a source of reference pressure including a passageway having a column of said two fluids disposed to oppose the communication pressure from said lower fluid and means for applying to said passageway a pressure substantially corresponding to the pressure of said upper fluid, said two fluids in said column providing an interfacial region in said passageway that shifts through a range of levels with movement on the part of said displacement means, said passageway in said range of levels being of a cross-sectional area of approximately at least one-fourth the cross-sectional area of said displacement means.

8. In combination in a device for regulating the relative amounts of two fluids in a vessel, said fluids comprising an upper relatively light fluid and a lower relatively dense fluid: a flow conduit providing a fluid passageway communicating with said vessel; adjustable valve means in said flow conduit to control fluid passage therethrough to modify the relative amounts of the two fluids in said vessel; a displacement means movable in response to pressure to control said adjustable valve; means providing pressure communication from said lower fluid to said displacement means, the pressure received by said communication means varying with the quantity of said lower fluid in said vessel relative to said upper fluid; and a source of reference pressure including a passageway confining a fluid column disposed to oppose hydrostatically the pressure from said lower fluid that is delivered to said pressure communicating means and including means for applying to said passageway a pressure substantially corresponding to the pressure of said upper fluid, said passageway being positioned in substantial part within said vessel to be maintained at substantially the same temperature as the fluid content of the vessel.

9. A combination as set forth in claim 6 in which said reference fluid body comprises a quantity of said upper fluid together with a quantity of said lower fluid and in which controllable means is included for permitting interflow between said vessel and said reference fluid body to change the proportion of the two fluids in the reference fluid body thereby to change the reference pressure.

10. In combination in a device for regulating the relative amounts of two fluids in a vessel, said fluids comprising an upper relatively light fluid and a lower relatively dense fluid; a flow conduit providing a fluid passageway communicating with said vessel; adjustable valve means in said flow conduit to control fluid passage therethrough to modify the relative amounts of the two fluids in said vessel; means responsive to differential pressure to control said adjustable valve; passage means providing pressure communication from said lower fluid to one side of said differential pressure means, the pressure communicated thereby varying with the quantity of said lower fluid in said vessel relative to said upper fluid; passage means providing pressure communication from said upper fluid in said vessel to the other side of said differential pressure means; and a fluid column as an additional source of pressure, said fluid column being disposed to oppose the pressure from said lower fluid exerted through said first passage means whereby the position of said valve means is determined by the pressure of said fluid column.

11. In combination in a device for regulating the relative amounts of two fluids in a vessel, said fluids comprising an upper relatively light fluid and a lower relatively dense fluid: a flow conduit providing a fluid passageway communicating with said vessel; adjustable valve means in said flow conduit to control fluid passage therethrough to modify the relative amounts of the two fluids in said vessel; means responsive to differential pressure to control said adjustable valve; walls confining a first fluid body on one side of said differential pressure means in communication with said upper fluid in said vessel; walls confining a second fluid body on the other side of said differential pressure means in communication with said lower fluid in said vessel, one of said first and second fluid bodies comprising a quantity of said upper fluid together with a quantity of said lower fluid; and a normally closed passage means interconnecting said first and second fluid bodies through which flow may be permitted temporarily to change the relative quantities of the two fluids in said one of said first and second fluid bodies.

12. In combination in a device for regulating the relative amounts of two fluids in a vessel, said fluids comprising an upper relatively light fluid and a lower relatively dense fluid: a flow conduit providing a fluid passageway communicating with said vessel; adjustable valve means in said flow conduit to control fluid passage therethrough to modify the relative amounts of the two fluids in said vessel; means responsive to differential pressure to control said adjustable valve; a passage means from said upper fluid in said vessel to one side of said differential pressure means; and a passage means from said lower fluid in said vessel to the other side of said differential pressure means, one of said passage means containing a quantity of one of said fluids adjacent said differential pressure means, the other of said passage means containing a quantity of the same fluid adjacent the differential pressure means and also a quantity of the other fluid spaced away from the differential pressure means.

13. A combination as set forth in claim 12 in which valve-controlled means is provided to vary the proportion of said fluid in said other of said passage means.

LOGAN C. WATERMAN.

CERTIFICATE OF CORRECTION.

Patent No. 2,309,228. January 26, 1943.

LOGAN C. WATERMAN.

It is hereby certified that error appears in the printed specification of the above numbered patent requiring correction as follows: Page 3, first column, line 71, for "columns" read --column--; page 5, first column, line 65, for "in" read --on--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.